United States Patent
Lopitaux et al.

(10) Patent No.: US 8,349,956 B2
(45) Date of Patent: Jan. 8, 2013

(54) TIRE WITH A TREAD COMPRISING AN SNBR ELASTOMER

(75) Inventors: Garance Lopitaux, Valignat (FR); Didier Vasseur, Clermont-Ferrand (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/002,628

(22) PCT Filed: Jun. 30, 2009

(86) PCT No.: PCT/EP2009/004714
§ 371 (c)(1),
(2), (4) Date: Feb. 28, 2011

(87) PCT Pub. No.: WO2010/000443
PCT Pub. Date: Jan. 7, 2010

(65) Prior Publication Data
US 2011/0263750 A1    Oct. 27, 2011

(30) Foreign Application Priority Data
Jul. 4, 2008  (FR) ..................................... 08 54565

(51) Int. Cl.
| | |
|---|---|
| *C08F 8/00* | (2006.01) |
| *C08L 9/00* | (2006.01) |
| *C08L 25/02* | (2006.01) |
| *C08L 33/18* | (2006.01) |
| *C08L 33/20* | (2006.01) |
| *C08K 3/00* | (2006.01) |
| *C08K 5/00* | (2006.01) |
| *B60C 1/00* | (2006.01) |

(52) U.S. Cl. ........ 525/191; 525/232; 525/238; 525/241; 524/424; 524/492; 524/495; 524/515

(58) Field of Classification Search .................. 525/191, 525/232, 238, 241; 524/424, 492, 495, 515
See application file for complete search history.

(56) References Cited

U.S. PATENT DOCUMENTS

| | | | |
|---|---|---|---|
| 5,225,479 A | 7/1993 | Senyek et al. | |
| 5,859,115 A | 1/1999 | Rennar | |
| 5,977,238 A | 11/1999 | Labauze | |
| 6,013,718 A | 1/2000 | Cabioch et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 7,300,981 B2 * | 11/2007 | Waddell et al. ............... 525/194 |
| 2001/0051685 A1 | 12/2001 | Obrecht et al. | |
| 2004/0051210 A1 | 3/2004 | Tardivat et al. | |
| 2004/0127617 A1 | 7/2004 | Vasseur et al. | |
| 2004/0132880 A1 | 7/2004 | Durel et al. | |
| 2005/0016650 A1 | 1/2005 | Durel et al. | |
| 2005/0016651 A1 | 1/2005 | Durel et al. | |
| 2005/0085594 A1 | 4/2005 | Waddell et al. | |
| 2005/0131112 A1 | 6/2005 | Henning et al. | |
| 2005/0209413 A1 | 9/2005 | Labauze et al. | |
| 2006/0089445 A1 | 4/2006 | Gandon-Pain | |
| 2007/0293619 A1 * | 12/2007 | Jacoby et al. ................. 524/493 |
| 2008/0033101 A1 | 2/2008 | Waddell et al. | |
| 2008/0281021 A1 | 11/2008 | Waddell et al. | |
| 2008/0319119 A1 | 12/2008 | Waddell et al. | |

FOREIGN PATENT DOCUMENTS

| | | |
|---|---|---|
| EP | 0 366 915 A1 | 5/1990 |
| EP | 0 537 040 A1 | 4/1993 |
| EP | 0 736 399 A1 | 10/1996 |
| EP | 1 544 238 A1 | 6/2005 |
| WO | WO 97/36724 | 10/1997 |
| WO | WO 99/16600 | 4/1999 |
| WO | WO 02/30939 A1 | 4/2002 |
| WO | WO 02/31041 A1 | 4/2002 |
| WO | WO 02/083782 A1 | 10/2002 |
| WO | WO 02/088238 A1 | 11/2002 |
| WO | WO 03/002648 A1 | 1/2003 |
| WO | WO 03/002649 A1 | 1/2003 |
| WO | WO 03/016837 A1 | 2/2003 |
| WO | WO 03/078475 A1 | 9/2003 |
| WO | WO 2004/044052 A1 | 5/2004 |
| WO | WO 2005/087859 A1 | 9/2005 |
| WO | WO 2006/061064 A1 | 6/2006 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/017060 A1 | 2/2007 |
| WO | WO 2007/070053 A1 | 6/2007 |
| WO | WO 2007/070063 A1 | 6/2007 |
| WO | WO 2008/003434 A1 | 1/2008 |
| WO | WO 2008/003435 A1 | 1/2008 |

* cited by examiner

OTHER PUBLICATIONS

International Search Report mailed Sep. 9, 2009 for International Application No. PCT/EP2009/004714.

*Primary Examiner* — Nathan M Nutter
(74) *Attorney, Agent, or Firm* — Buchanan Ingersoll & Rooney PC

(57) ABSTRACT

The present invention relates to a tire having a tread comprising a rubber composition that comprises at least:
  as a first diene elastomer, between 5 and 25 phr of a styrene-nitrile-butadiene terpolymer (SNBR) having a nitrile monomer content between 4 and 18% by weight;
  a second diene elastomer other than SNBR;
  a reinforcing filler;
  a liquid plasticizer, the glass transition temperature of which is below −20° C.
The invention makes it possible to improve the properties of rolling resistance and of grip on wet ground of tire treads.

14 Claims, No Drawings

TIRE WITH A TREAD COMPRISING AN SNBR ELASTOMER

BACKGROUND

1. Field

Disclosed herein are tire treads and rubber compositions that can be used in these tire treads.

2. Description of Related Art

As is known, a tire tread has to meet a large number of often conflicting technical requirements, including a low rolling resistance, a high wear resistance and a high grip on both the dry road and the wet road.

This compromise in properties, in particular from the viewpoint of the rolling resistance and the wear resistance, was able to be improved in recent years with regard to energy-saving "Green Tyres", intended in particular for passenger vehicles, by virtue of the use of novel low hysteresis rubber compositions having the feature of being reinforced predominantly by specific inorganic fillers, described as reinforcing fillers, in particular by highly dispersible silicas (HDSs), capable of rivalling, from the viewpoint of the reinforcing power, conventional tire-grade carbon blacks.

Enhancing the grip properties remains, however, a constant concern of tire designers.

SUMMARY

On continuing their research, the applicants have discovered a novel tire tread formulation comprising a low content of a specific SNBR, which makes it possible to obtain tires having improved grip on wet ground and improved rolling resistance.

Thus, a first embodiment relates to a tire that comprises a tread comprising a rubber composition that comprises at least:
- as a first diene elastomer, between 5 and 25 phr of a styrene-nitrile-butadiene terpolymer (SNBR) having a nitrile monomer content between 4 and 18% by weight;
- a second diene elastomer other than SNBR;
- a reinforcing filler;
- a liquid plasticizer, the glass transition temperature ($T_g$) of which is below $-20°$ C.

Using certain SNBR elastomers in tire treads in order to improve some of their usage properties was already known, as described for example in patent documents EP 0 366 915, EP 0 537 040 or U.S. Pat. No. 5,225,479, EP 0 736 399 or U.S. Pat. No. 5,859,115.

However, it has been observed that the use of high contents of SNBR, as described in the above prior art, risks increasing the stiffness of the tire treads and is detrimental to their compromise of properties, particularly in terms of grip on wet ground and rolling resistance.

The tires of certain embodiments disclosed herein are particularly intended to be fitted on motor vehicles of the passenger type, SUV ("Sport Utility Vehicle") type, two-wheel vehicles (especially motorcycles) and aircraft, industrial vehicles chosen from vans, heavy vehicles—i.e. underground trains, buses, road transport vehicles (lorries, towing vehicles, trailers), off-road vehicles such as agricultural or civil-engineering vehicles, and other transport or handling vehicles.

DETAILED DESCRIPTION OF SPECIFIC EMBODIMENTS

The invention and its advantages will be readily understood in light of the description and the exemplary embodiments that follow.

I—Measurements and Tests Used

The rubber compositions are characterized, before and after curing, as indicated below.

I.1—Shore a Hardness

The Shore A hardness of the compositions after curing is assessed in accordance with the ASTM D 2240-86 standard.

I.2-Dynamic Properties

The dynamic properties are measured on a viscosity analyser (Metravib VA4000) according to the ASTM D 5992-96 standard. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded during a temperature sweep at a fixed stress of 0.7 MPa; the value of tan δ observed at $-10°$ C. (i.e. $\tan(\delta)_{-10° C.}$) and the value of tan δ observed at $40°$ C. (i.e. $\tan(\delta)_{40° C.}$) are recorded.

It is recalled, in a manner well known to a person skilled in the art, that the value of $\tan(\delta)_{-10° C.}$ is representative of the potential to grip on wet ground: the higher $\tan(\delta)_{-10° C.}$, the better the grip. The value of $\tan(\delta)_{40° C.}$ is representative of the hysteresis of the material, and therefore of the rolling resistance: the lower $\tan(\delta)_{40° C.}$, the lower the rolling resistance.

I.3—Tire Tests

A) Grip on Wet Ground

In order to assess the grip performance on wet ground, the behaviour of tires fitted to a motor vehicle of Ford Focus make and model travelling, under maximum speed conditions, around a very winding circuit that is sprayed in order to keep the ground wet, is analysed. The minimum time needed to travel the whole of the circuit is measured; a value greater than that of the control, arbitrarily set at 100, indicates an improved result, that is to say a shorter travel time.

B) Braking on Wet Ground, with an ABS System

The tires are fitted to a motor vehicle of Renault Mégane 1.6 RTE make and model, equipped with an ABS braking system and the distance needed to go from 50 km/h to 10 km/h is measured during sudden braking on sprayed ground (bituminous concrete). A value greater than that of the control, arbitrarily set at 100, indicates an improved result, that is to say a shorter braking distance.

C) Braking on Dry Ground, with an ABS System

The tires are fitted to a motor vehicle of Renault Mégane 1.6 RTE make and model, equipped with an ABS braking system and the distance needed to go from 100 km/h to 0 km/h is measured during sudden braking on dry ground (bituminous concrete). A value greater than that of the control, arbitrarily set at 100, indicates an improved result, that is to say a shorter braking distance.

II. Conditions for Implementation of Embodiments

The tire described herein comprises a tread which comprises a rubber composition comprising:
- as a first diene elastomer, between 5 and 25 phr of a styrene-nitrile-butadiene terpolymer (SNBR) having a nitrile monomer content between 4 and 18% by weight;
- a second diene elastomer other than SNBR;
- a reinforcing filler;
- a liquid plasticizer, the glass transition temperature ($T_g$) of which is below $-20°$ C.

In the present description, unless expressly indicated otherwise, all the percentages (%) shown are % by weight. Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

II.1—SNBR Terpolymer

The tread of the tire in accordance with the invention has a first essential feature of comprising between 5 and 25 phr of SNBR that has a nitrile monomer content between 4 and 18% by weight.

SNBR is used at a content between 5 and 25 phr. Below 5 phr, the targeted effect is insufficient, whereas above 25 phr, the matrix becomes too stiff which may detrimental, in the end, to the grip properties. For these reasons, the SNBR content is more preferably less than 20 phr, more preferably still between 5 and 18 phr.

Certain SNBR elastomers are well known. They have, in particular, been described, and also their application in tire treads, in the aforementioned documents EP 0 366 915, EP 0 537 040 or U.S. Pat. No. 5,225,479, EP 0 736 399 or U.S. Pat. No. 5,859,115.

The following are suitable in particular as butadiene monomers: 1,3-butadiene, 2,3-dimethyl-1,3-butadiene, 2-methyl-1,3-butadiene, 2-ethyl-1,3-butadiene, 2-phenyl-1,3-butadiene, or mixtures of these dienes. Among these conjugated dienes, use is preferably made of 1,3-butadiene, 2-methyl-1,3-butadiene and in particular 1,3-butadiene.

The styrene monomers which may be used are those which contain 8 to 16 carbon atoms in the molecule, such as styrene, α-methylstyrene, 2-methylstyrene, 3-methylstyrene, 4-methyl-styrene, 4-cyclohexylstyrene, 4-(p-toluene)styrene, p-chlorostyrene, p-bromostyrene, 4-tert-butylstyrene, or mixtures of these compounds, among which styrene is preferred.

The nitrile monomers are, for example, acrylonitrile, methacrylonitrile, ethylacrylonitrile, crotononitrile, 2-pentenonitrile or mixtures of these compounds, among which acrylonitrile is preferred.

According to one preferred embodiment, the SNBR has a nitrile monomer content between 5 and 15% by weight.

According to another preferred embodiment, the SNBR has a glass transition temperature ($T_g$) within the temperature range from 0° C. to −60° C., more preferably in the range from −5° C. to −50° C. The $T_g$ may especially be adjusted over a large temperature range, by virtue of the amounts of stirene and/or butadiene present in the terpolymer.

Certain of the SNBRs described previously are commercially available, in particular sold by Lanxess under the name "Krynac VP KA 8683", a product comprising around 10% by weight of acrylonitrile, the glass transition temperature of which is −34° C.

II.2—Second Diene Elastomer

It is recalled here that the term "diene" elastomer or rubber should be understood to mean, in a known manner, an elastomer resulting at least in part (i.e., a homopolymer or a copolymer) from diene monomers (monomers bearing two carbon-carbon double bonds which may or may not be conjugated).

The second diene elastomer of the composition of the tread of the tyre in accordance with the invention is preferably chosen from the group of highly unsaturated diene elastomers formed by polybutadienes (BR), synthetic polyisoprenes (IR), natural rubber (NR), butadiene copolymers, isoprene copolymers and mixtures of these elastomers. Such copolymers are more preferably chosen from the group formed by butadiene-styrene copolymers (SBR), isoprene-butadiene copolymers (BIR), isoprene-styrene copolymers (SIR) and isoprene-butadiene-styrene copolymers (SBIR).

The elastomers may, for example, be block, random, sequential or microsequential elastomers and may be prepared in dispersion or in solution; they may be coupled and/or star-branched or else functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or else of polyether groups (such as described, for example, in U.S. Pat. No. 6,503,973). As other examples of such functionalized elastomers, mention may also be made of elastomers (such as SBR, BR, NR or IR) of the epoxidized type.

The following are especially suitable: polybutadienes having a content (mol %) of 1,2-units of between 4% and 80% or those having a content (mol %) of cis-1,4-units of greater than 80%, polyisoprenes, butadiene-styrene copolymers and in particular those having a $T_g$ (glass transition temperature, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene-isoprene copolymers, in particular those having an isoprene content of between 5% and 90% by weight and a $T_g$ of −40° C. to −80° C., or isoprene-styrene copolymers, in particular those having a styrene content of between 5% and 50% by weight and a $T_g$ of between −25° C. and −50° C.

In the case of butadiene-styrene-isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-units plus 3,4-units of the isoprene part of between 5% and 70% and a content (mol %) of trans-1,4-units of the isoprene part of between 10% and 50%, and more generally any butadiene-styrene-isoprene copolymer having a $T_g$ of between −20° C. and −70° C., are suitable in particular.

According to one particular embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or else SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a $T_g$ of between −10° C. and −55° C.; such an SBR can advantageously be used as a mixture with a BR preferably having more than 90% (mol %) of cis-1,4-bonds.

According to one particular embodiment of the invention, the rubber composition comprises an SBR content of between 75 and 95 phr, preferably between 80 and 95 phr and more preferably between 85 and 95 phr.

According to another particular embodiment, the diene elastomer is predominantly (for more than 50 phr) an isoprene elastomer. The expression "isoprene elastomer" is understood to mean, in a known manner, an isoprene homopolymer or copolymer, in other words a diene elastomer chosen from the group formed by natural rubber (NR), synthetic polyisoprenes (IR), various isoprene copolymers and blends of these elastomers. Among the isoprene copolymers, mention will in particular be made of isobutene-isoprene copolymers (butyl rubber—IIR), isoprene-styrene copolymers (SIR), isoprene-butadiene copolymers (BIR) or isoprene-butadiene-styrene copolymers (SBIR). This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

According to another preferred embodiment, the rubber composition comprises a blend of a (one or more) "high $T_g$" diene elastomer exhibiting a $T_g$ of between −70° C. and 0° C. and of a (one or more) "low $T_g$" diene elastomer exhibiting a $T_g$ of between −110° C. and −80° C., more preferably between −105° C. and −90° C. The high $T_g$ elastomer is preferably chosen from the group formed by S-SBRs, E-SBRs, natural rubber, synthetic polyisoprenes (having a content (mol %) of cis-1,4 linkages preferably greater than 95%), BIRs, SIRs, SBIRs and the mixtures of these elastomers. The low $T_g$ elastomer preferably comprises butadiene units in a content (mol %) at least equal to 70%; it preferably consists of a polybutadiene (BR) having a content (mol %) of cis-1,4 linkages greater than 90%.

According to another particular embodiment, the rubber composition comprises, for example, from 30 to 100 phr, in particular from 50 to 100 phr, of a high $T_g$ elastomer as a blend with 0 to 70 phr, in particular from 0 to 50 phr, of a low $T_g$ elastomer; according to another example, it comprises, for the whole of the 100 phr, one or more SBR(s) prepared in solution.

According to another particular embodiment, the diene elastomer of the composition comprises a blend of a BR (as low $T_g$ elastomer) having a content (mol %) of cis-1,4 linkages greater than 90%, with one or more S-SBRs or E-SBRs (as high $T_g$ elastomer(s)).

II.3—Reinforcing Filler

Use may be made of any type of reinforcing filler known for its capabilities of reinforcing a rubber composition which can be used for the manufacture of tires, for example an organic filler, such as carbon black, a reinforcing inorganic filler, such as silica, or else a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of the functionalized polyvinyl organic fillers as described in Applications WO-A-2006/069792, WO-A-2006/069793, WO-A-2008/003434 and WO-A-2008/003435.

The expression "reinforcing inorganic filler" should be understood, in the present patent application, by definition, to mean any inorganic or mineral filler (whatever its colour and its natural or synthetic origin), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the expression "reinforcing inorganic filler" is also understood to mean mixtures of various reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in Application WO 03/16837.

The reinforcing inorganic filler used, in particular if it is silica, preferably has a BET surface area of between 45 and 400 $m^2/g$, more preferably of between 60 and 300 $m^2/g$.

Preferably, the content of total reinforcing filler (carbon black and/or reinforcing inorganic filler, such as silica) is between 20 and 200 phr, more preferably between 30 and 150 phr, the optimum being, in a known manner, different depending on the particular applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy vehicle According to a preferred embodiment, use is made of a reinforcing filler comprising between 30 and 150 phr, more preferably between 50 and 120 phr, of inorganic filler, particularly silica, and optionally carbon black; the carbon black, when it is present, is preferably used at a content of less than 20 phr, more preferably of less than 10 phr (for example between 0.1 and 10 phr).

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "asymmetrical" depending on their particular structure, as described, for example, in Applications WO 03/002648 (or US 2005/016651) and WO 03/002649 (or US 2005/016650).

Particularly suitable, without the definition below being limiting, are "symmetrical" silane polysulphides corresponding to the following general formula (VIII):

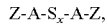  (VIII)

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, in particular propylene);
Z corresponds to one of the formulae below:

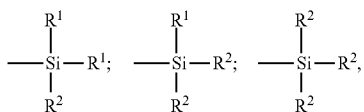

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (VIII), in particular the usual mixtures available commercially, the mean value of the "x" index is a fractional number preferably between 2 and 5, more preferably in the vicinity of 4. However, the invention may also advantageously be carried out, for example, with disulphide alkoxysilanes (x=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulphides (in particular disulphides, trisulphides or tetrasulphides), more particularly bis(monoethoxydimethylsilylpropyl) tetrasulphide, as described in Patent Application WO 02/083782 (or US 2004/132880).

Mention will in particular be made, as coupling agent other than alkoxysilane polysulphide, of bifunctional POSs (polyorganosiloxanes) or else of hydroxysilane polysulphides ($R^2$=OH in the above formula VIII), such as described in Patent Applications WO 02/30939 (or U.S. Pat. No. 6,774, 255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions of the tire disclosed herein, the content of coupling agent is preferably between 4 and 12 phr, more preferably between 3 and 8 phr.

A person skilled in the art will understand that a reinforcing filler of another nature, in particular of an organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II.4—Low $T_g$ Liquid Plasticizer

The rubber composition of the tread of the tire disclosed herein has another essential feature of comprising a plasticizing agent which is liquid (at 23° C.) (referred to as "low $T_g$" liquid plasticizer), the $T_g$ of which is by definition below −20° C., preferably below −40° C.

Any extender oil, whether of aromatic or non-aromatic nature, and/or any liquid plasticizing agent known for its plasticizing properties with regard to diene elastomers, can be used. Liquid plasticizers chosen from the group formed by naphthenic oils, particularly hydrogenated naphthenic oils, paraffinic oils, MES oils, TDAE oils, ester plasticizers, phosphate plasticizers and the mixtures of these compounds are particularly suitable.

Mention may be made, as phosphate plasticizers, of those that contain between 12 and 30 carbon atoms, for example trioctyl phosphate. As examples of ester plasticizers, mention may especially be made of the compounds chosen from the group formed by trimellitates, pyromellitates, phthalates, 1,2-cyclohexane dicarboxylates, adipates, azelates, sebacates, glycerol triesters, and mixtures of these compounds.

Among the triesters above, mention may be made as preferred glycerol triesters, of those which are composed predominantly (for more than 50% by weight, more preferably for more than 80% by weight) of an unsaturated $C_{18}$ fatty acid, that is to say a fatty acid chosen from the group formed by oleic acid, linoleic acid, linolenic acid and the mixtures of these acids. More preferably, whether of synthetic origin or natural origin (in the case, for example, of sunflower or rapeseed vegetable oils), the fatty acid used is composed for more than 50% by weight, more preferably still for more than 80% by weight, of oleic acid. Such triesters (trioleates) comprising a high content of oleic acid are well known; for example they have been described in Application WO 02/088238 (or US 2004/0127617), as plasticizing agents in treads for tires.

A person skilled in the art will know how to adjust the content of low $T_g$ liquid plasticizer according to the particular implementation conditions described herein. It is preferably between 5 and 80 phr. Below the minimum indicated, the targeted technical effect may prove insufficient, whereas above 80 phr there is a risk of reducing the grip of the tires. For these reasons, the content of low $T_g$ liquid plasticizer is more preferably between 5 and 40 phr.

According to another preferred embodiment, the tire compositions may also comprise, as plasticizer which is solid (at 23° C.), a hydrocarbon resin having a $T_g$ above +20° C., preferably above +30° C., such as described, for example in Applications WO 2005/087859, WO 2006/061064 and WO 2007/017060.

Hydrocarbon resins are polymers well known to a person skilled in the art which are therefore miscible by nature in the diene elastomer composition(s), when they are additionally described as being "plasticizing". They have been described, for example, in the work entitled "*Hydrocarbon Resins*" by R.

Mildenberg, M. Zander and G. Collin (New York, VCH, 1997, ISBN 3-527-28617-9), chapter 5 of which is devoted to their applications, in particular in the tire rubber field (5.5. *"Rubber Tires and Mechanical Goods"*). They may be aliphatic or aromatic or else of the aliphatic/aromatic type, that is to say based on aliphatic and/or aromatic monomers. They may be natural or synthetic and may or may not be oil-based (if such is the case, also known under the name of petroleum resins). They are preferably exclusively hydrocarbon-based, that is to say that they comprise only carbon and hydrogen atoms.

Preferably, the plasticizing hydrocarbon resin exhibits at least one, more preferably all, of the following features:
- a $T_g$ above 20° C.;
- a number-average molecular weight ($M_n$) of between 400 and 2000 g/mol;
- a polydispersity index ($I_p$) of less than 3 (reminder: $I_p=M_w/M_n$ with $M_w$ the weight-average molecular weight).

The $T_g$ is measured, in a known manner, by DSC (Differential Scanning calorimetry) according to the ASTM D3418 (1999) standard. The macrostructure ($M_w$, $M_n$ and $I_p$) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "WATERS" columns in series ("STYRAGEL" HR4E, HR1 and HR0.5); detection by differential refractometer ("WATERS 2410") and its associated operating software ("WATERS EMPOWER").

According to one particularly preferred embodiment, the plasticizing hydrocarbon resin is chosen from the group formed by cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins. Use is preferably made, among the above copolymer resins, of those chosen from the group formed by (D)CPD/vinylaromatic copolymer resins, (D)CPD/terpene copolymer resins, (D)CPD/$C_5$ fraction copolymer resins, terpene/vinylaromatic copolymer resins, $C_5$ fraction/vinylaromatic copolymer resins and the mixtures of these resins.

The term "terpene" combines here, in a known manner, the α-pinene, β-pinene and limonene monomers; use is preferably made of a limonene monomer, which compound exists, in a known manner, in the form of three possible isomers: L-limonene (laevorotatory enantiomer), D limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyp styrene, methoxystyrenes, chlorostyrenes, hydroxystyrenes, vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The content of hydrocarbon resin is preferably between 5 and 60 phr, in particular between 5 and 40 phr, more preferably still between 10 and 30 phr.

The content of total plasticizing agent (i.e., liquid plasticizer plus, if appropriate, solid hydrocarbon resin) is preferably between 40 and 100 phr, more preferably within a range of from 50 to 80 phr.

II.5—Various Additives

The rubber compositions of the treads of tires in accordance with the invention also comprise all or some of the usual additives customarily used in the elastomer compositions intended for the manufacture of treads, such as, for example, pigments, protective agents, such as antiozone waxes, chemical antiozonants, antioxidants, plasticizing agents other than those mentioned above, antifatigue agents, reinforcing resins, methylene acceptors (for example, phenol-novolac resin) or methylene donors (for example, HMT or H3M), a crosslinking system based either on sulphur or on sulphur donors and/or on peroxide and/or on bismaleimides, vulcanization accelerators and vulcanization activators.

These compositions may also comprise, in addition to coupling agents, coupling activators, agents for covering the inorganic fillers or more generally processing aids capable, in a known manner, by virtue of an improvement in the dispersion of the filler in the rubber matrix and of a lowering in the viscosity of the compositions, of improving their ability to be processed in the raw state, these agents being, for example, hydrolysable silanes, such as alkylalkoxysilanes, polyols, polyethers, primary, secondary or tertiary amines or hydroxylated or hydrolysable polyorganosiloxanes.

II.6—Preparation of the Rubber Compositions

The compositions used in the treads of tires of the invention may be manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., for example between 40° C. and 100° C., finishing phase during which the crosslinking system is incorporated.

The process for preparing such compositions comprises, for example, the following stages:
- incorporating between 5 and 25 phr of a first SNBR diene elastomer having a nitrile monomer content between 4 and 18% by weight, during a first stage (referred to as a "non-productive" stage), into a second diene elastomer other than SNBR, a reinforcing filler and a liquid plasticizer having a $T_g$ below −20° C., everything being kneaded thermomechanically (for example in one or more steps), until a maximum temperature of between 110° C. and 190° C. is reached;
- cooling the combined mixture to a temperature below 100° C.;
- subsequently incorporating, during a second stage (referred to as a "productive" stage), a crosslinking system;
- kneading everything up to a maximum temperature below 110° C.

By way of example, the non-productive phase is carried out in a single thermomechanical stage during which, in a first step, all the necessary base constituents (SNBR and second diene elastomer, plasticizer, reinforcing filler and coupling agent in the case of an inorganic filler) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase is preferably between 1 and 15 min.

After cooling the mixture thus obtained, the crosslinking system is then incorporated in an external mixer, such as an open mill, maintained at a low temperature (for example, between 40° C. and 100° C.). The combined mixture is then mixed (productive phase) for a few minutes, for example between 2 and 15 min.

The crosslinking system itself is preferably based on sulphur and on a primary vulcanization accelerator, in particular an accelerator of the sulphenamide type. Added to this vulcanization system, are various known secondary accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 3.0 phr and the primary accelerator content is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are more preferably chosen from to the group formed by 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and the mixtures of these compounds. Preferably, a primary accelerator of the sulphenamide type is used.

The final composition thus obtained may then be calendered, for example in the form of a sheet or a slab, in particular for laboratory characterization, or else is extruded, for example to form a rubber profiled element used for manufacturing a tread.

The embodiments disclosed herein relate to the tires described above, both in the raw state (i.e., before curing) and in the cured state (i.e., after crosslinking or vulcanization).

III—Exemplary Embodiments of the Invention

III.1—Preparation of the Compositions

The tests which follow are carried out in the following manner: the filler (silica or carbon black), the coupling agent in the presence of silica, the diene elastomers (SNBR and second diene elastomer), the reinforcing filler, the liquid plasticizer having a $T_g$ below −20° C., and also the various other ingredients, with the exception of the vulcanization system, are successively introduced into an internal mixer (final fill ratio: around 70% by volume), the initial vessel temperature of which is around 60° C. Thermomechanical working (non-productive phase) is then carried out in one stage, which lasts in total approximately 3 to 4 minutes, until a maximum "dropping" temperature of 165° C. is reached.

The mixture thus obtained is recovered and cooled and then sulphur and an accelerator of sulphenamide type are incorporated in a mixer (homofinisher) at 30° C., the combined mixture being mixed (productive phase) for an appropriate time (for example, between 5 and 12 min).

The compositions thus obtained are subsequently calendered, either in the form of slabs (thickness of 2 to 3 mm) or of fine sheets of rubber, for the measurement of their physical or mechanical properties, or extruded in the form of a tread.

III.2—Tire Tests

This test demonstrates the improvement, in terms of grip on wet ground and rolling resistance, provided by three treads of tires in accordance with the invention, in comparison with a tread of a control tire.

In order to do this, four rubber compositions were prepared as indicated previously, three intended for treads of tires in accordance with the invention (denoted hereinbelow by C.2, C.3 and C.4) and one for a tread of a tire not in accordance with the invention (control denoted hereinbelow by C.1).

The control composition C.1 is a standard composition for a person skilled in the art, which is conventionally used for manufacturing treads for passenger vehicle tires, based on SBR and BR.

The compositions C.2, C.3 and C.4 of the treads of tires according to the invention are based on SBR and SNBR elastomers.

These four compositions were tested as passenger vehicle tire treads, in accordance with the tests indicated in section 1.3 above.

Their formulations (in phr or parts by weight per hundred parts of elastomer (rubber), therefore including SNBR), their mechanical properties and also the results of the running tests of the tires have been summarized in the appended Tables 1, 2 and 3.

The compositions C.2 and C.3, on the one hand, and C.4, on the other hand, were formulated with 10 and 20 phr of SNBR respectively.

The compositions C.2, C.3 and C.4 comprise liquid plasticizers having a $T_g$ below −20° C., in an amount substantially identical to that of the composition C.1, an amount that is however adjusted so as to keep the stiffness (Shore A hardness) of the compositions at substantially constant level, compared to the control C.1.

It is noted that the compositions of the treads of tires according to the invention have substantially improved dynamic properties:

with, on the one hand, a value of $\tan(\delta)_{max}$ (at 40° C.) which is slightly lower relative to the control composition C.1, synonymous with a hysteresis and therefore with a rolling resistance which is reduced;

on the other hand and above all, a value of $\tan(\delta)$ at −10° C. of compositions C.2, C.3 and C.4 which is markedly higher than that of the composition C.1, a recognized indicator of an improved grip on wet ground.

It should therefore be concluded that the above improvements are obtained by virtue of the addition of the specific SNBR to the treads in accordance with the invention.

During the running of the tires, a very substantial improvement in the grip on wet ground is indeed observed for the compositions C.2, C.3 and C.4 of the tires according to the invention, compared to the control composition CA, as is very clearly borne out by the 19% and 13% increases obtained in the test of grip on wet ground (described in section I.3-A). The compositions C.2, C.3 and C.4 do not, on the other hand, provide any improvement as regards the braking on dry ground of the tires.

Furthermore, the test of grip on wet ground is better in the case of compositions C.2 and C.3 than in the case of composition C.4. Thus, it is noted, unexpectedly, that an SNBR content between 5 and 15 phr gives better results, in terms of grip on wet ground, than a content of 20 phr.

In summary, the results of this test demonstrate that the use of an SNBR terpolymer at a content between 5 and 25 phr, having a specific nitrile monomer content between 4 and 18% by weight, makes it possible to markedly improve the compromise between the rolling resistance and the grip on wet ground of treads of the tires disclosed herein.

The invention having been thus described, by reference to certain specific embodiments and examples, it will be understood that these are not limiting of the appended claims.

TABLE 1

| Composition No. | C.1 | C.2 | C.3 | C.4 |
|---|---|---|---|---|
| SBR (1) | 70 | 90 | 90 | 80 |
| BR (2) | 30 | — | — | — |
| SNBR (3) | — | 10 | 10 | 20 |
| Filler (4) | 80 | 80 | 80 | 80 |
| Coupling agent (5) | 6.4 | 6.4 | 6.4 | 6.4 |
| Plasticizer (6) | 15 | — | — | — |
| Plasticizer (7) | — | — | 28 | 28 |
| Plasticizer (8) | — | 28 | — | — |
| Resin (9) | 15 | 5 | 5 | 5 |
| Stearic acid (10) | 2.0 | 2.0 | 2.0 | 2.0 |
| ZnO (11) | 2.5 | 2.5 | 2.5 | 2.5 |
| Sulphur (12) | 1.1 | 1.1 | 1.1 | 1.1 |
| Accelerator (13) | 2.0 | 2.0 | 2.0 | 2.0 |
| DPG (14) | 1.5 | 1.5 | 1.5 | 1.5 |
| Anti-ozone agent (15) | 1.9 | 1.9 | 1.9 | 1.9 |

(1) SBR solution (content expressed as dry SBR); 25% of styrene, 58% of 1,2-polybutadiene units and 22% of trans-1,4-polybutadiene units ($T_g = -21°$ C.);
(2) BR with 4.3% of 1,2-units; 2.7% of trans units; 93% of cis-1,4 units ($T_g = -106°$ C.);
(3) SNBR: Krynac VP KA 8683 from Lanxess;
(4) silica: "Zeosil 1165 MP" from Rhodia, of "HD" type - (BET and CTAB: around 160 $m^2/g$);
(5) TESTP coupling agent ("Si69" from Degussa);
(6) MES oil ("Catenex SNR" from Shell);
(7) diisodecyl adipate ("Jayflex DIDA" from Exxon Mobil);
(8) glycerol trioleate (sunflower oil comprising 85% by weight of oleic acid - "Lubrirob Tod 1880" from Novance);
(9) polylimonene ("Dercolyte L120" from DRT);
(10) stearine ("Pristerene" from Uniquema);
(11) zinc oxide (industrial grade - from Umicore);
(12) sulphur;
(13) N-cyclohexyl-2-benzothiazyl sulfenamide (Santocure CBS from Flexsys);
(14) DPG = Diphenylguanidine ("Perkacit DPG" from Flexsys);
(15) N-1,3-dimethylbutyl-N-phenyl-para-phenylenediamine (Santoflex 6-PPD from Flexsys).

TABLE 2

| Composition No. | C.1 | C.2 | C.3 | C.4 |
|---|---|---|---|---|
| Shore A | 67 | 66 | 68 | 69 |
| Tgδ (−10° C.) | 0.77 | 0.89 | 0.89 | 0.88 |
| Tgδ (40° C.) | 0.237 | 0.217 | 0.221 | 0.217 |

TABLE 3

| Composition No. | C.1 | C.2 | C.3 | C.4 |
|---|---|---|---|---|
| Grip on wet ground (r.u) | 100 | 119 | 119 | 113 |
| Wet ABS braking (r.u) | 100 | 104 | 105 | 104 |
| Dry ground ABS braking (r.u) | 100 | 100 | 99 | 98 |

The invention claimed is:

1. A tire having a tread comprising a rubber composition that comprises at least:
   as a first diene elastomer between 5 and 25 phr of a styrene-nitrile-butadiene terpolymer (SNBR) having a nitrile monomer content between 4 and 18% by weight;
   a second diene elastomer other than SNBR;
   a reinforcing filler;
   a liquid plasticizer, the glass transition temperature ($T_g$) of which is below −20° C.

2. The tire according to claim 1, wherein the second diene elastomer is chosen from the group consisting of polybutadienes, natural rubber, synthetic polyisoprenes, butadiene copolymers, isoprene copolymers and mixtures of these elastomers.

3. The tire according to claim 2, wherein the second diene elastomer is a styrene-butadiene copolymer (SBR).

4. The tire according to claim 3, wherein the SBR content is between 75 and 95 phr.

5. The tire according to claim 1, wherein the SNBR content is less than 20 phr.

6. The tire according to claim 5, wherein the SNBR content is between 5 and 15 phr.

7. The tire according to claim 1, wherein the nitrile monomer content of the SNBR is between 5 and 15% by weight.

8. The tire according to claim 1, wherein the reinforcing filler comprises carbon black and/or silica.

9. The tire according to claim 1, wherein the reinforcing filler is present in an amount between 20 and 200 phr.

10. The tire according to claim 9, wherein the amount of reinforcing filler is between 30 and 150 phr.

11. The tire according to claim 1, wherein the liquid plasticizer having a $T_g$ below −20° C. is chosen from the group consisting of naphthenic oils, paraffinic oils, MES oils, TDAE oils, ester plasticizers, phosphate plasticizers and mixtures of these compounds.

12. The tire according to claim 1, wherein the rubber composition further comprises a hydrocarbon resin having a $T_g$ above 0° C.

13. The tire according to claim 12, wherein the hydrocarbon resin is chosen from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and mixtures of these resins.

14. The tire according to claim 1, wherein the nitrile monomer is acrylonitrile.

* * * * *